(12) United States Patent
Chung et al.

(10) Patent No.: US 8,644,013 B2
(45) Date of Patent: Feb. 4, 2014

(54) MOVABLE HINGE

(75) Inventors: Feng Yu Chung, New Taipei (TW);
Chih Huang Peng, New Taipei (TW);
You Shiuan Tsai, New Taipei (TW)

(73) Assignee: Sinher Technology Inc., New Taipei (TW)

( * ) Notice: Subject to any disclaimer, the term of this patent is extended or adjusted under 35 U.S.C. 154(b) by 141 days.

(21) Appl. No.: 13/420,065

(22) Filed: Mar. 14, 2012

(65) Prior Publication Data
US 2013/0239367 A1   Sep. 19, 2013

(51) Int. Cl.
*G06F 1/16* (2006.01)

(52) U.S. Cl.
USPC ........................................ 361/679.27; 16/392

(58) Field of Classification Search
USPC ........................................ 361/679.27; 16/392
See application file for complete search history.

(56) References Cited

U.S. PATENT DOCUMENTS

| | | | |
|---|---|---|---|
| 5,481,430 A * | 1/1996 | Miyagawa et al. | 361/679.09 |
| 5,548,478 A * | 8/1996 | Kumar et al. | 361/679.27 |
| 6,295,038 B1 * | 9/2001 | Rebeske | 345/1.1 |
| 7,106,579 B2 * | 9/2006 | Maskatia et al. | 361/679.28 |
| 7,317,611 B2 * | 1/2008 | Dittmer | 361/679.27 |
| 7,639,479 B2 * | 12/2009 | Chuang et al. | 361/679.06 |
| 7,725,988 B2 * | 6/2010 | Kim et al. | 16/361 |
| 8,050,024 B2 * | 11/2011 | Hsu et al. | 361/679.27 |
| 8,068,334 B2 * | 11/2011 | Tang | 361/679.27 |
| 8,089,748 B2 * | 1/2012 | Chiang | 361/679.01 |
| 8,102,675 B2 * | 1/2012 | Kilpinen | 361/814 |
| 8,300,394 B2 * | 10/2012 | Senatori | 361/679.27 |
| 8,320,113 B2 * | 11/2012 | Xiao | 361/679.27 |
| 2005/0207101 A1 * | 9/2005 | Hwang et al. | 361/681 |
| 2009/0221335 A1 * | 9/2009 | Nakazawa | 455/575.4 |

FOREIGN PATENT DOCUMENTS

| | | |
|---|---|---|
| TW | M388822 | 9/2010 |
| TW | M413776 | 10/2011 |

* cited by examiner

*Primary Examiner* — Lisa Lea Edmonds
(74) *Attorney, Agent, or Firm* — Muncy, Geissler, Olds & Lowe, PLLC

(57) ABSTRACT

A movable hinge to pivotally couple a base and a back panel of an electronic device includes a first slide portion and a second slide portion slidable against the first slide portion. The first slide portion includes a track portion and a first sloped surface connected to the track portion. The second slide portion has a first pin with two ends respectively running through the track portion and fastening to the base, a butting portion coupled on the first pin and slidable thereon, and an elastic element interposed between the butting potion and base. The butting portion is pushed by the elastic element to press the first slide portion to slide against the second slide portion and drive the back panel to move against the base.

5 Claims, 7 Drawing Sheets

MOVABLE HINGE

FIELD OF THE INVENTION

The present invention relates to a hinge and particularly to a movable hinge.

BACKGROUND OF THE INVENTION

Flip electronic devices, such as notebook computer, mobile phone or the like, usually have a screen connected with a keyboard via a hinge to provide a required torsional force when the screen is unfolded against the keyboard. The common flip electronic device often has a hinge pivotally coupled with a base and an upper lid thereof to make them foldable and unfoldable. For instance, R.O.C. patent No. M388822 discloses a turnable double-pin hinge with a first pin fastened to a screen bracket and a second pin fastened to a base bracket. The first pin can be swiveled about the second pin to change the position of the first pin upwards or rearwards, thereby drive the screen bracket upwards or rearwards to prevent interference between the screen housing and base housing during unfolding. It also has a track panel and a control member to harness movements so that the screen bracket can be swiveled at an angle equal to the sum of the swivel angles of the first pin and second pin. Namely the swivel angle of the screen is formed by combining the turning angles of the first pin and second pin. However, the aforesaid flip electronic device has to swivel the screen and base at an included angle greater than 90 degrees to provide a comfortable visual angle for users to see the information displayed on the display device such as the screen.

In order to save use space, R.O.C. patent No. M413776 discloses a band type double-pin hinge. It includes a pin sleeve and a first swivel member and a second swivel member located in the pin sleeve. The pin sleeve has a coupling plate and a first coupling portion and a second coupling portion located on the coupling plate. The first coupling portion and second coupling portion have respectively a first pin passage and a second pin passage to hold respectively the first swivel member and second swivel member. The first coupling portion has an edge at one side of the coupling pate formed a first notch communicating with the first pin passage, and the second coupling portion has another edge at another side of the coupling plate formed a second notch communicating with the second pin passage. The double-pin hinge thus formed can be swiveled sequentially at a greater angle, and also can be unfolded lightly and folded at a greater force. It also allows the upper lid to be flipped 360 degrees to fold over the base. Although it saves use space, the entire electronic device has to be taken up to flip the upper lid for 360 degrees, then be rested on a flat surface. It still leaves a lot to be desired in terms of usability.

From user's perspective, usability can be greatly enhanced if the hinge is constructed to enable the screen to be flipped directly from the tabletop not greater than 90 degrees without holding the entire electronic device while the screen can be seen by users at the front side.

SUMMARY OF THE INVENTION

The primary object of the present invention is to solve the problem of the hinge structure in the conventional electronic devices that requires a greater use space and users should hold the entire device to adjust the screen to a suitable viewing position both of that result in poor usability.

To achieve the foregoing object, the invention provides a movable hinge to pivotally couple with a base and a back panel of an electronic device. The back panel has a support portion and a housing compartment located in the support portion. The movable hinge includes a first slide portion and a second slide portion slidable against the first slide portion. The first slide portion is held in the housing compartment, and includes a track portion and a first sloped surface connected to the track portion. The second slide portion has a first pin with two ends respectively running through the track portion and fastening to the base, a butting portion coupled on the first pin and slidable thereon, and an elastic element coupled on the first pin and interposed between the butting potion and the base. The first pin is located at the bottom end of the track portion. The back panel is formed at a first position. The butting portion compresses the elastic element to generate a return force thereof so that the butting portion is pushed by the return force of the elastic element to move along the first sloped surface to press the first slide portion to slide against the second slide portion and drive the back panel to move against the base.

In one aspect the electronic device includes a display device and a hinge portion to pivotally couple the display device and the back panel.

In another aspect the hinge portion includes a second pin hinged on the display device and a fastening portion fastened to the back panel.

In yet another aspect the elastic element is a spring.

In yet another aspect the butting portion has a second sloped surface corresponding to the first sloped surface.

The invention thus formed provides many advantages, notably:

With the butting portion pushed by the elastic element, the second sloped surface of the butting portion presses the first sloped surface of the first slide portion so that the first slide portion is butted by the butting portion and slid against the second slide portion to drive the back panel to move against the base. Incorporating with the hinge portion, the display device can be unfolded directly from the tabletop and flipped for 180 degrees for folding without lifting more than 90 degrees, so that information displayed on the display device can be seen by users clearly. Usability improves and use space also can be saved.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
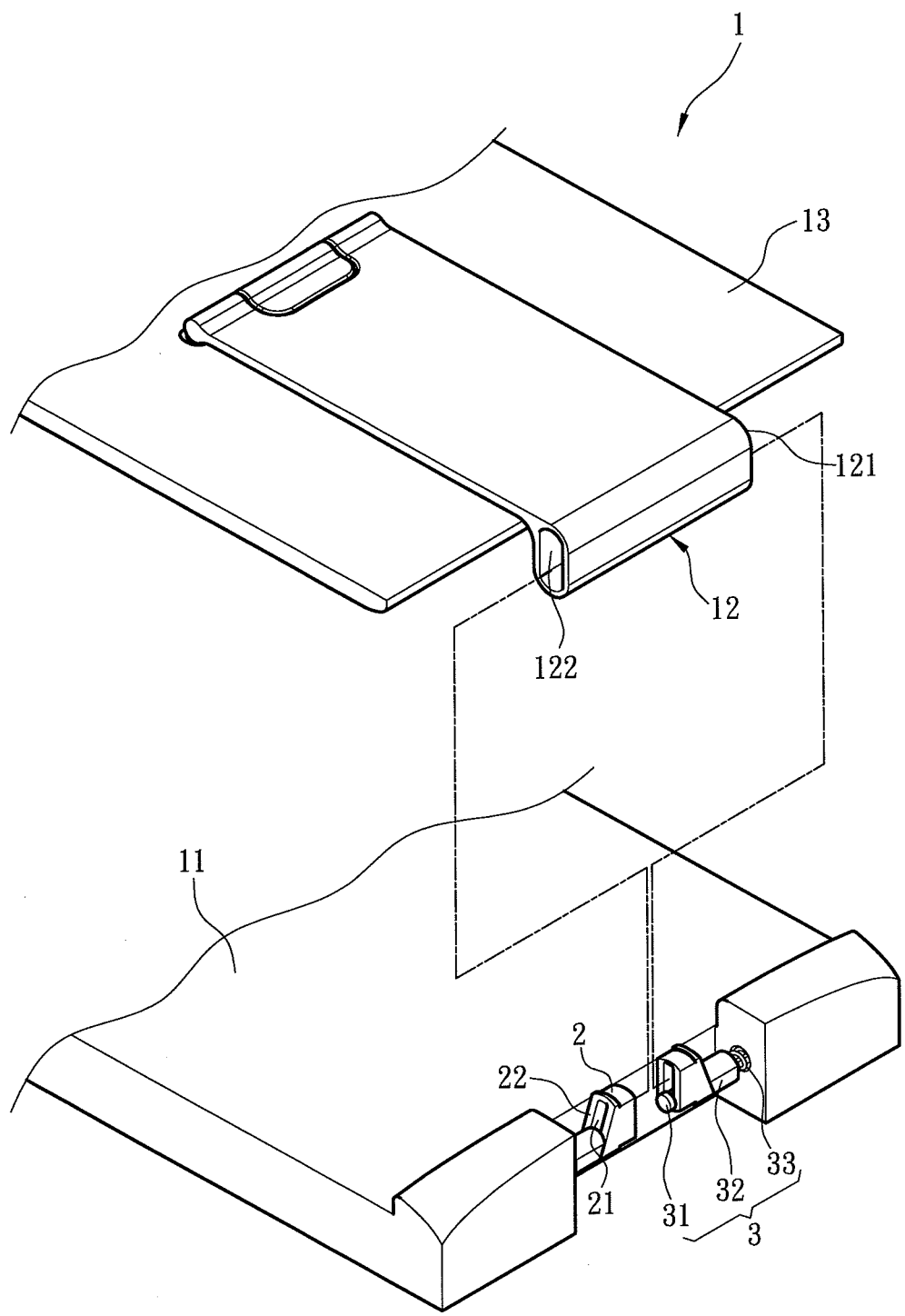
FIG. 1 is a perspective view of the movable hinge of the invention.
Figure 2:
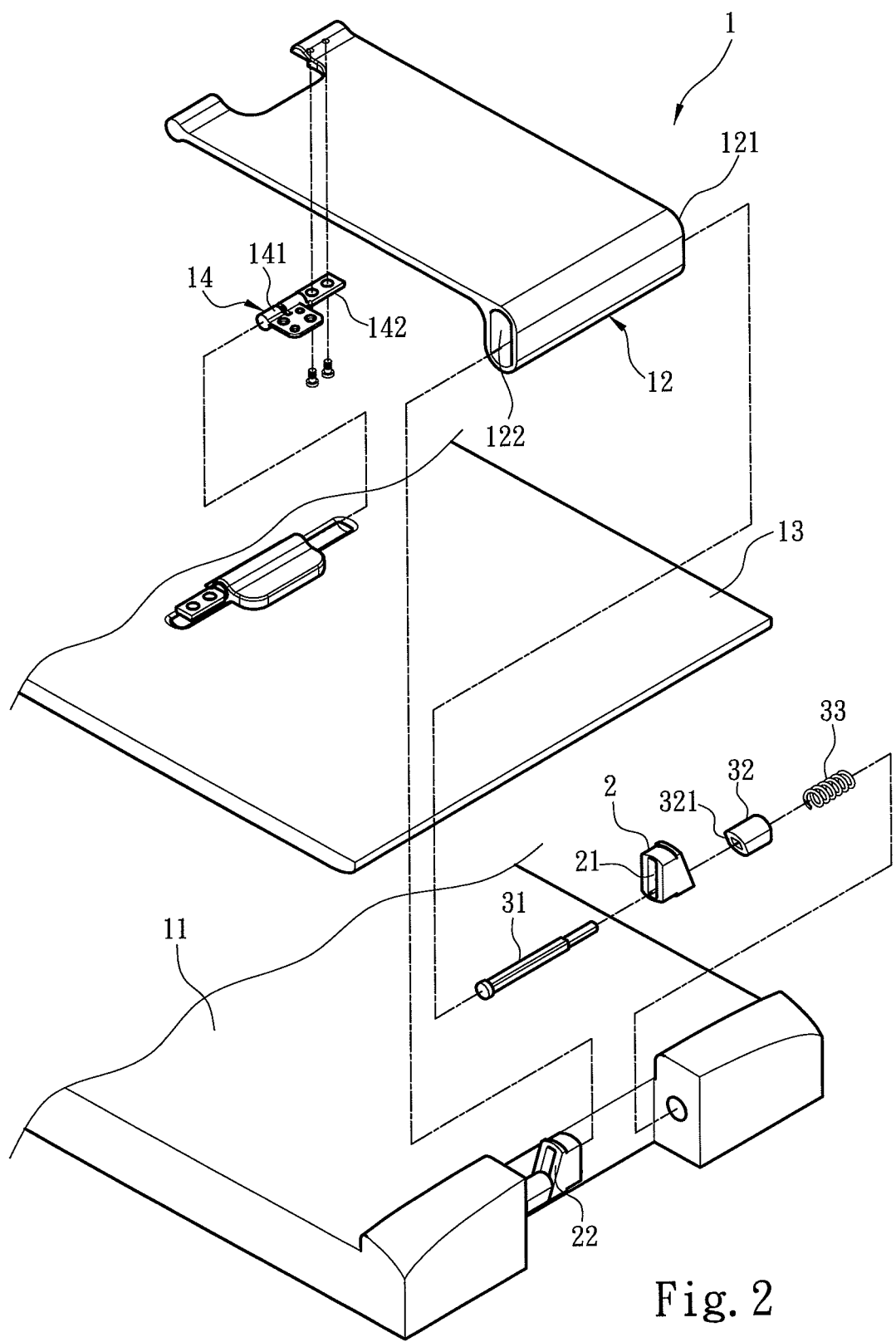
FIG. 2 is an exploded view of the movable hinge of the invention.

Please refer to FIGS. 1 and 2, the present invention aims to provide a movable hinge to pivotally couple a base 11 and a back panel 12 of an electronic device 1. The back panel 12 has a support portion 121 and a housing compartment 122 located in the support portion 121. The movable hinge includes a first slide portion 2 and a second slide portion 3 slidable against the first slide portion 2. The first slide portion 2 is held in the housing compartment 122, and includes a track portion 21 and a first sloped surface 22 connected to the track portion 21. The second slide portion 3 has a first pin 31 with two ends respectively running through the track portion 21 and fastening to the base 11, a butting portion 32 coupled on the first pin 31 and slidable thereon, and an elastic element 33 coupled on the first pin 31 and interposed between the butting potion 32 and base 11. The elastic element 33 is a spring to push the butting portion 32 along the first sloped surface 22 to press the first slide portion 2 sliding against the second slide portion 3 to drive the back panel 12 to move against the base 11. In an embodiment of the invention, in order to facilitate pressing of the butting portion 32 against the first slide portion 2 along the first sloped surface 22, the butting portion 32 has a second sloped surface 321 corresponding to the first sloped surface 22 to smooth sliding of the first slide portion 2 against the second slide portion 3. The electronic device 1 further includes a display device 13 and a hinge portion 14 to pivotally couple the display device 13 and back panel 12. The hinge portion 14 includes a second pin 141 hinged on the display device 13 and a fastening portion 142 connected to the back panel 12, thereby the display device 13 can be flipped against the back panel 12 about 180 degrees.

Figure 3A:
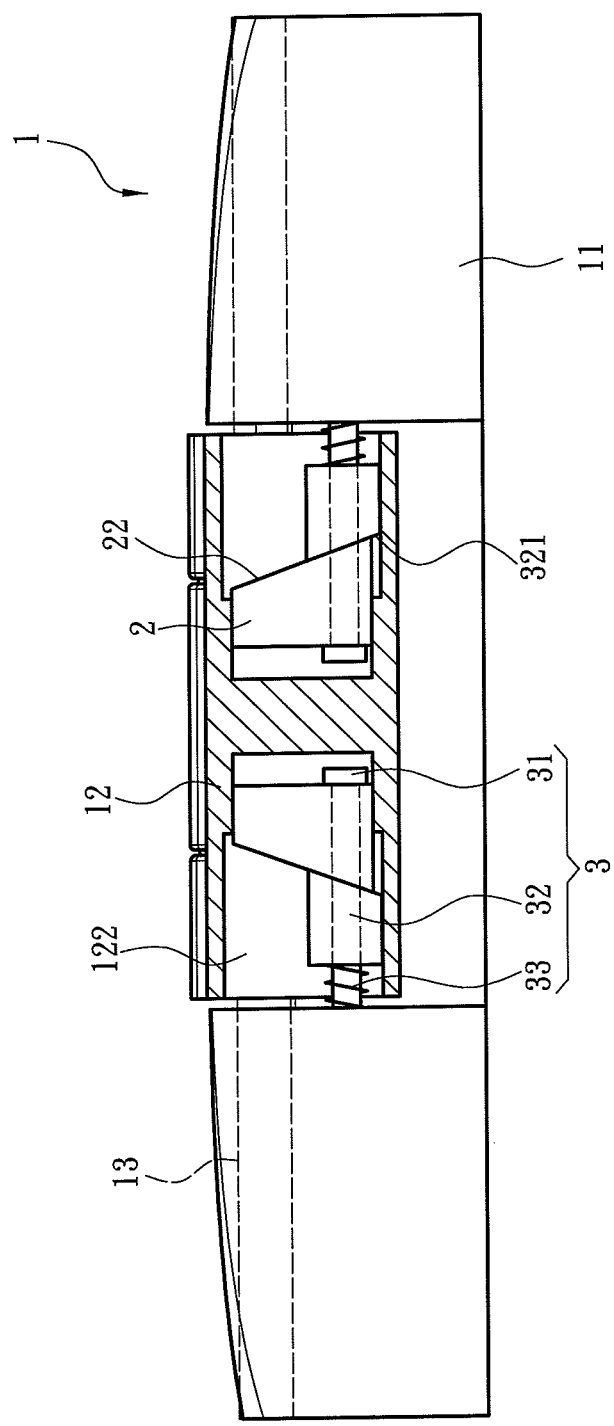
FIGS. 3A and 3B are schematic views of the movable hinge of the invention in operating conditions.
Figure 3B:
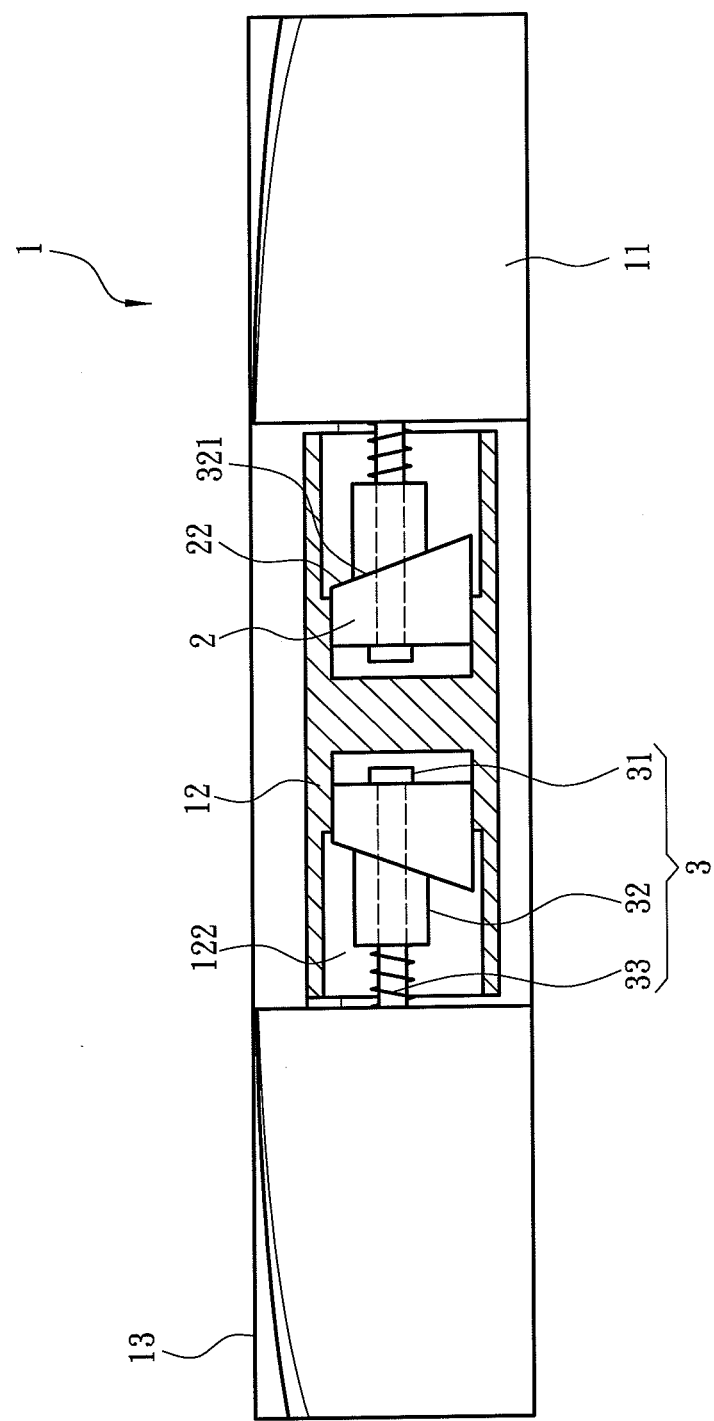

Referring to FIGS. 3A and 3B, when the electronic device 1 is in a folding and unused state, the display device 13 is located between the back panel 12 and base 11 with the back panel 12 at a first position, and the first pin 31 is located at the bottom end of the track portion 21, the butting portion 32 presses tightly the elastic element 33 to provide a return force thereof. Since the display device 13 is retained between the back panel 12 and base 11, the first slide portion 2 is blocked by the display device 13 and cannot move against the second slide portion 3, and the butting portion 32 also is blocked from moving along the first sloped surface 22 to push the first slide portion 2, hence the elastic element 33 cannot release the return force. After the display device 13 is flipped over the back panel 12 about 180 degrees through the hinge portion 14, the display device 13 is located above the back panel 12 and the elastic element 33 releases the return force to push the butting potion 22 to move along the first sloped surface 22 so that the first slide portion 2 is pushed to slide against the second slide portion 3 until the first pin 31 reaches and butts the top portion of the track portion 21, meanwhile the back panel 12 also is driven to move against the base 11 such that the base is located at a second position.

Figure 4A:
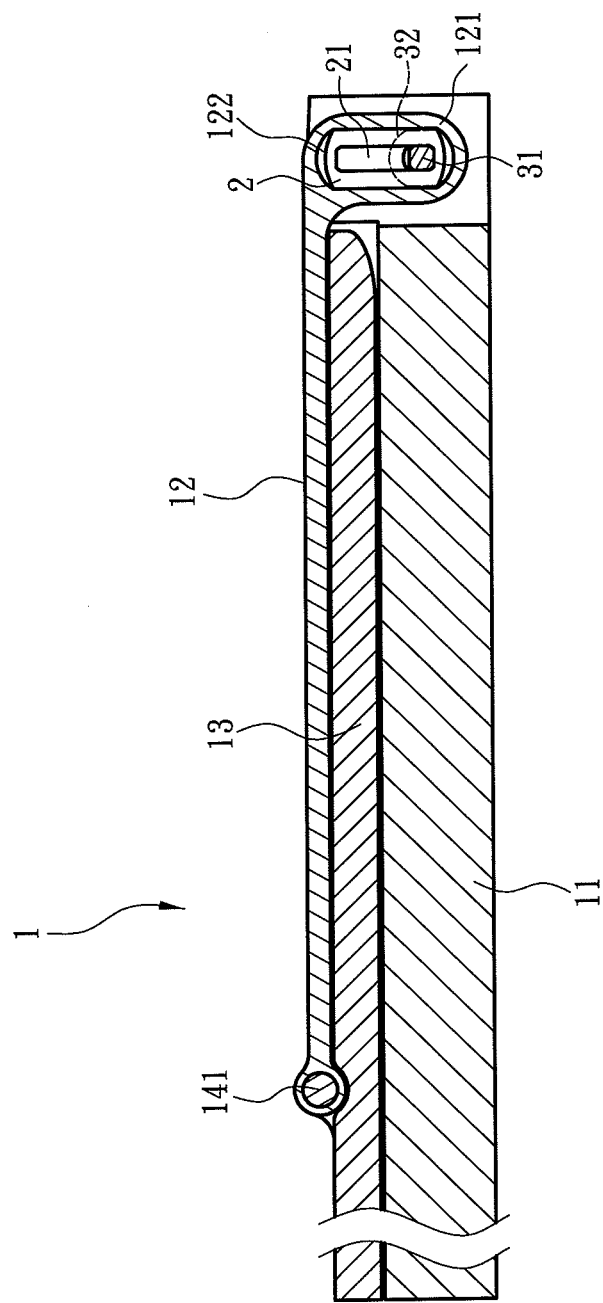
FIGS. 4A through 4C are schematic views of the movable hinge of the invention in use conditions.
Figure 4B:
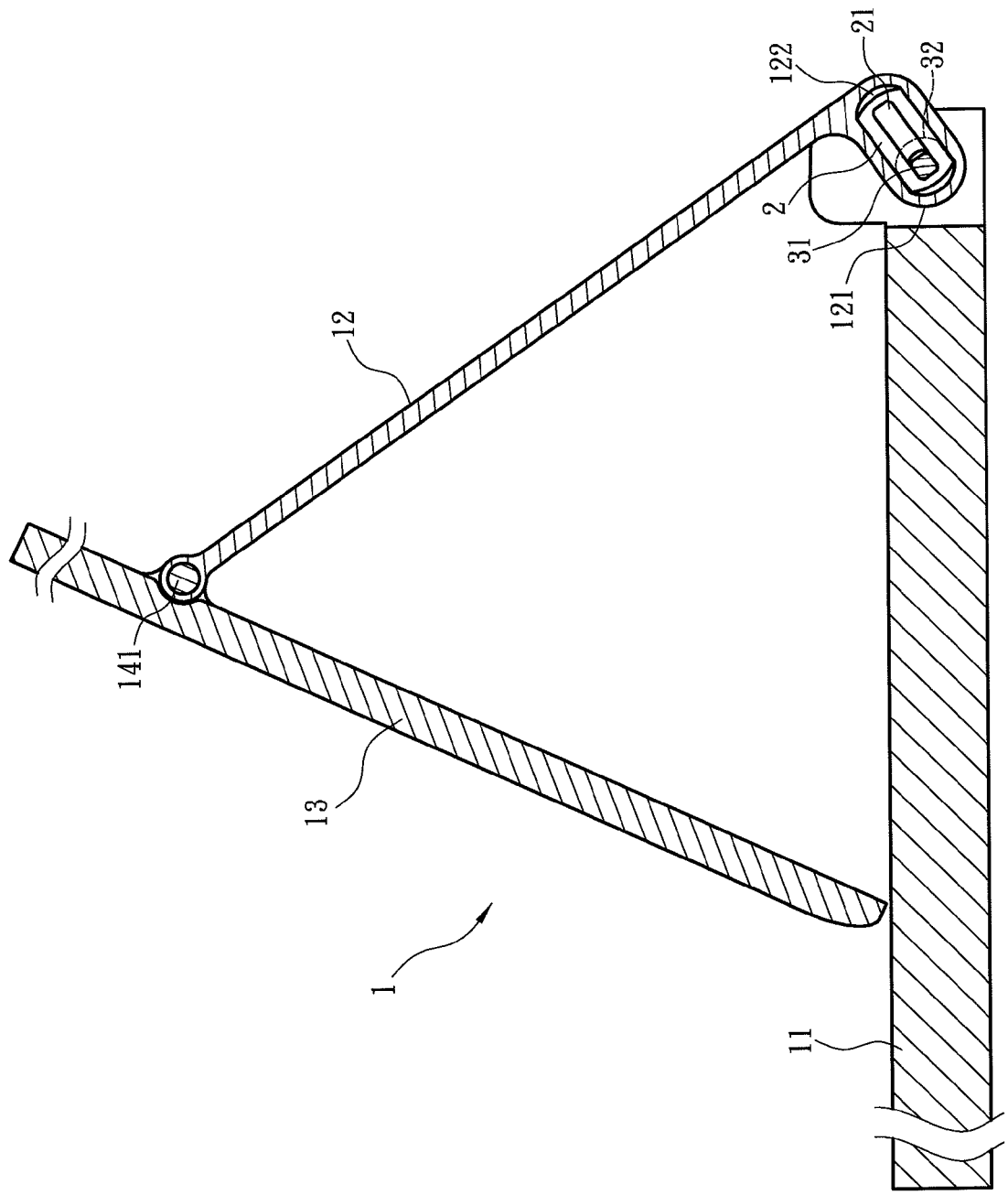
Figure 4C:
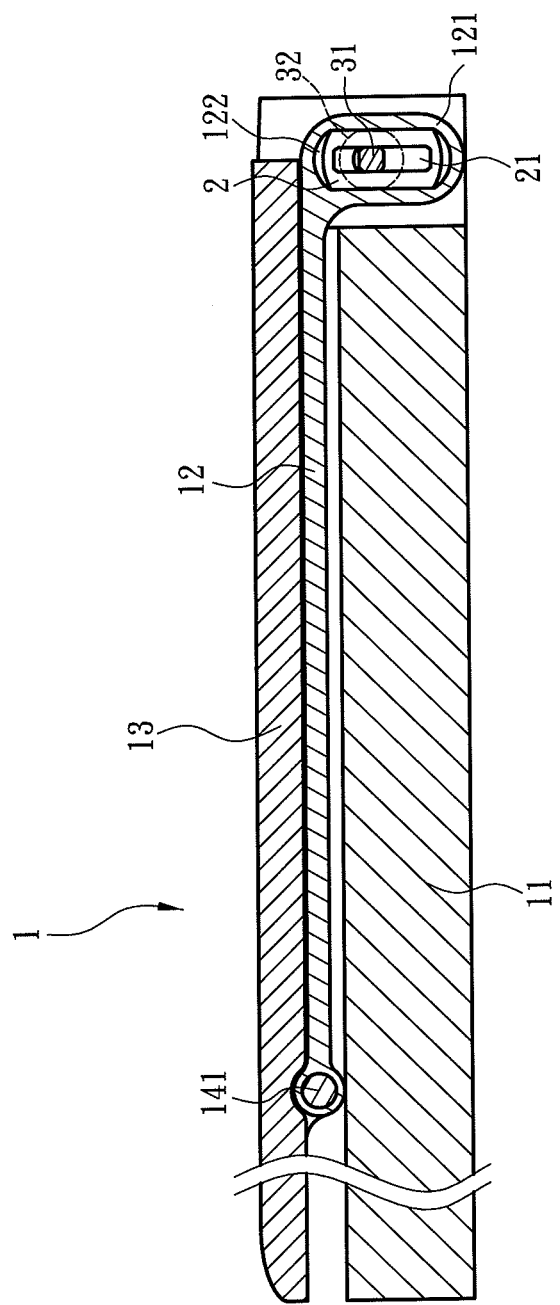

Please refer to FIGS. 4A, 4B and 4C for an embodiment of the invention in use conditions. The display device 13 is folded over the base 11 with the back panel 12 connected to the display device 13 and base 11, and the back panel 12 is at the first position. When using the electronic device 1 is intended, the display device 13 can be flipped about the movable hinge; after the display device 13 is flipped to a desired angle, it can further flip against the back panel 12 via the hinge portion 14. When the display device 13 is flipped about 180 degrees, it leans on the back panel 12 and both of the display device 13 and back panel 12 are folded over the base 11, meanwhile the elastic element 33 releases the return force to push the butting portion 32 to move along the first sloped surface 22 to push the first slide portion 2 so that the first slide portion 2 in turn slides against the second slide portion 3 until the first pin 31 reaches and butts the top portion of the track portion 21, and the back panel 12 is driven at the same time to move against the base 11 to be formed at the second position, therefore the display device 13 is at the position to display information viewed by the users.

Thus, by pushing the butting portion 32 via the elastic element 33, the second sloped surface 321 of the butting portion 32 is butted the first sloped surface 22 of the first slide portion 2, so that the first slide portion 2 is pushed by the butting portion 32 to slide against the second slide portion 3 to drive the back panel 12 to move against the base 11; incorporating with the hinge portion 14, the display device 13 can be directly unfolded from the desktop without over 90 degrees for flipping 180 degrees to be folded, thereby the information displayed on the display device 13 can be seen by users clearly. Usability improves and use space also is saved.

While the preferred embodiment of the invention has been set forth for the purpose of disclosure, it is not the limitation of the invention, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A movable hinge to pivotally couple a base and a back panel of an electronic device, the back panel including a support portion and a housing compartment in the support portion, the movable hinge comprising:
 a first slide portion which is held in the housing compartment and includes a track portion and a first sloped surface connected to the track portion; and
 a second slide portion including a first pin with two ends respectively running through the track portion and fastening to the base, a butting portion coupled on the first pin and slidable thereon, and an elastic element coupled on the first pin and interposed between the butting portion and the base; the first pin being located at a bottom end of the track portion, the back panel being formed at a first position where the butting portion presses the elastic element to generate a return force thereof so that the butting portion is pushed by the return force of the elastic element to move along the first sloped surface to press the first slide portion to slide against the second slide portion and also drive the back panel to move against the base.

2. The movable hinge of claim 1, wherein the electronic device further includes a display device and a hinge portion to pivotally couple the display device on the back panel.

3. The movable hinge of claim 2, wherein the hinge portion includes a second pin hinged on the display device and a fastening portion connected to the back panel.

4. The movable hinge of claim 1, wherein the elastic element is a spring.

5. The movable hinge of claim 1, wherein the butting portion includes a second sloped surface corresponding to the first sloped surface.

* * * * *